Figure 1:
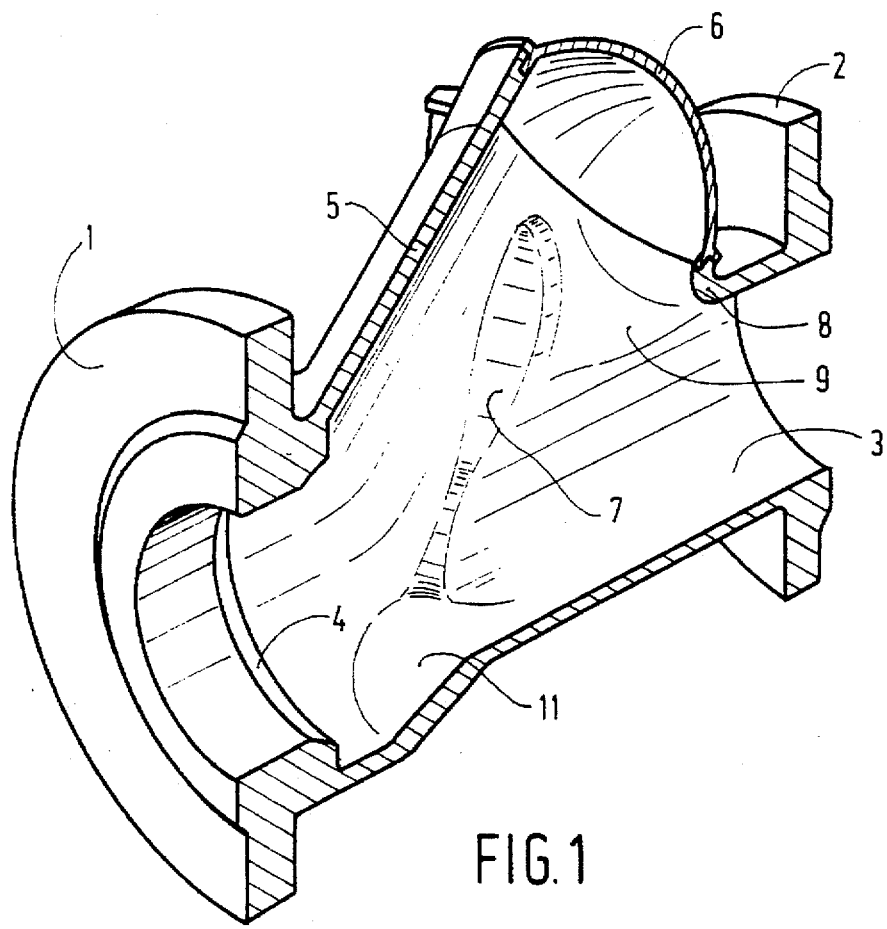

United States Patent

Bergen

[11] Patent Number: 5,709,242
[45] Date of Patent: Jan. 20, 1998

[54] DEVICE FOR BLOCKING A LIQUID FLOW THROUGH A PIPE IN ONE DIRECTION

[75] Inventor: Ludovicus Frederikus Bergen, Purmerend, Netherlands

[73] Assignee: Metalo Monti V.O.F., Zaandam, Netherlands

[21] Appl. No.: 602,822
[22] PCT Filed: Aug. 24, 1994
[86] PCT No.: PCT/EP94/02803
§ 371 Date: Feb. 27, 1996
§ 102(e) Date: Feb. 27, 1996
[87] PCT Pub. No.: WO95/06833
PCT Pub. Date: Mar. 9, 1995

[30] Foreign Application Priority Data

Sep. 1, 1993 [NL] Netherlands ............ 93.01504

[51] Int. Cl.$^6$ ............................................ F16K 15/04
[52] U.S. Cl. ............................ 137/533.11; 137/533.17
[58] Field of Search ...................... 137/533.11, 533.15, 137/533.17

[56] References Cited

U.S. PATENT DOCUMENTS

| | | | |
|---|---|---|---|
| 193,605 | 7/1877 | Hay | 137/533.11 X |
| 199,307 | 1/1878 | Naeher | 137/533.11 X |
| 841,474 | 1/1907 | Wendelken | 137/533.11 X |
| 1,549,007 | 8/1925 | Khun | 137/533.11 X |
| 1,700,234 | 1/1929 | McCrosky | 137/533.11 |
| 3,105,516 | 10/1963 | Werra et al. | 137/533.11 |
| 3,346,008 | 10/1967 | Scaramucci | 137/533.15 X |
| 4,501,292 | 2/1985 | Maloblocki | 137/533.11 |
| 4,687,023 | 8/1987 | Harbison et al. | 137/533.11 X |

FOREIGN PATENT DOCUMENTS

| | | | |
|---|---|---|---|
| 2538873 | 7/1984 | France | 137/533.11 |
| 3741547 | 6/1989 | Germany | 137/533.11 |

*Primary Examiner*—Gerald A. Michalsky

[57] ABSTRACT

A device for blocking a liquid flow through a pipe in one direction, said device being provided with a substantially spherical valve body, which can closingly cooperate with a substantially annular valve seat, which is positioned substantially transversely to the liquid flow. A guide element in provided for guiding said valve body in a path between a position in which said valve body is positioned near or against said valve seat (closed position) and a position in which the valve body is spaced from the valve seat by some distance (open position). In its open position said valve body can be positioned almost entirely outside the liquid flow. At least one outwardly extending projection is provided for effecting a reduction of the liquid pressure within the valve casing, at the side of the valve body remote from the valve seat.

5 Claims, 3 Drawing Sheets

DEVICE FOR BLOCKING A LIQUID FLOW THROUGH A PIPE IN ONE DIRECTION The invention relates to a device for blocking a liquid flow through a pipe in one direction, said device being provided with a substantially spherical valve body, which can closingly co-operate with a substantially annular valve seat, which is positioned substantially transversely to the liquid flow, whereby means are provided for guiding said valve body in a path between a position in which said valve body is positioned near or against said valve seat (closed position) and a position in which the valve body is substantially outside the liquid flow (open position), whereby a valve casing is present, within which said valve body is located in said open position. A device of this type, frequently briefly referred to as a non-return valve, may for example be used in a waste water treatment plant.

U.S. Pat. No. 3.105.516 discloses such device, whereby the valve body is maintained in its open position by a liquid cushion which is formed by liquid in the valve casing behind the valve body. There is a large space for guiding the liquid to the cushion and a limited space for the liquid flowing from the cushion downstream of the valve.

The pipe in which the non-return valve is mounted may extend both horizontally and vertically, whereby the valve casing extends in an oblique sideways direction from the pipe, usually at an angle of approximately 45° with respect to the pipe, in the direction of the liquid flow. The valve casing forms part of the housing of the non-return valve, which housing furthermore consists of a part of the pipe. when the pipe extends vertically and the downward flow in the pipe is to be blocked, the valve body is positioned above the valve seat and has a specific mass which is higher than the specific mass of the liquid in question. As a result of this the valve body bears on the valve seat when the liquid is not flowing. A downward flow of the liquid is not possible thereby, whilst an upward flow of the liquid will cause the valve body to rise from the valve seat, so that the liquid can flow. The object is thereby that when the rate of flow is higher the valve body is displaced within the valve casing, in an oblique sideways direction with respect to the liquid pipe, therefore.

When an upward flow of the liquid in a vertical pipe is to be blocked, a valve body having a lower specific mass than the liquid in question may be used, whereby the valve body is positioned under the seat. When there is no flow, the valve body is pressed against the valve seat by the upward force, thus blocking the upward flow. When the flow is directed downwards the valve body is pushed away from the seat, so that the liquid is able to pass the valve body.

When the liquid pipe extends horizontally it is likewise possible to use a floating or a sinking valve body. In case of a sinking valve body the valve casing will be positioned at the upper side of the pipe, so that the valve body will sink from the valve casing into the pipe when there is only a small flow or no flow at all. When a floating valve body is used the valve casing will be positioned at the bottom side of the pipe, so that a corresponding result is achieved. The liquid flow in the horizontal pipe is blocked in one direction because the liquid presses the valve body against the valve seat in that direction.

With a non-return valve of this kind timely and correct closing of the valve is important. The valve body usually consists of a metal ball thereby, around which rubber is vulcanized, so that an adequate closing down on the metal seat is achieved. The desired specific mass of the valve body is thereby achieved by drilling holes in the metal ball, for example, or by making it hollow by some other method. Furthermore it has become apparent in practice that the valve body is not or only partially displaced within the valve casing when there is a large liquid flow, as a result of which there is a distinct flow resistance within the non-return valve. Furthermore it frequently happens that the valve body makes a vibrating movement in the liquid flow, which may have all kinds of disadvantageous consequences.

The object of the invention is to provide a non-return valve which operates efficiently and which obviates the above drawbacks.

In order to accomplish that objective according to the invention parts of the valve casing are projecting outwardly for providing an additional liquid flow between the space within the valve casing, at the side of the valve body remote from the valve seat, and the downstream part of the pipe in every open position of the valve body, thereby effecting within the said space a lower liquid pressure than the liquid pressure at the side of the valve body towards the valve seat.

According to another feature of the invention the valve casing has a cylindrical part having a larger diameter than the valve body, said valve casing at one end being provided with a detachable cover and at the other end connecting to the pipe, at the point where a space is located at the downstream side of the valve seat, said space having a larger diameter than the valve body, whilst other parts of the substantially cylindrical pipe has a smaller diameter, whereby the axes of said two cylindrical parts intersect at an angle of approximately 45°, whereby the housing formed by the valve casing and the pipe is configured such that the said liquid connection is essentially formed by having the housing deviate outwards from the line of intersection of the cylinders of the said two cylindrical parts, at a location remote from the plane of symmetry through the said axes. By creating space for the liquid flow at this location there will constantly be a wide liquid connection between the side of the valve body remote from the valve seat and the downstream part of the pipe.

When the valve is opened to a small extent, that is the valve body is positioned at a short distance from the valve seat, the liquid will flow along the valve body. According to one feature of the invention the housing of the non-return valve is configured such that when the valve is slightly opened the valve body will be located near the wall of the housing opposite the valve casing, so that the liquid flow at that side of the valve will be restricted. According to one feature of the invention the housing of the valve may furthermore be configured such that when the valve is slightly opened the liquid flow is substantially directed to the side of the valve body where the valve casing is located. Because the speed of the flow will be reduced within the valve casing after the flow has passed the space between the valve body and the valve seat, the liquid pressure will become lower, as a result of which the valve body will move in the direction of the valve casing.

According to another feature of the invention the path of the valve body is such that initially the valve body is guided from the closed position in the direction of the liquid flow, whereby the path deflects sideways towards the valve casing when the position of the valve body is such that the liquid flow substantially passes along the valve body at the side of the valve casing. According to one feature of the invention the valve body may thereby be guided into its path by an inwardly extending part of the wall of the housing, which extends at least partially into the valve casing. By using this guide it can be prevented that the valve body bears against the wall of the valve casing in such a manner that the liquid connection between the space within the valve casing, at the side of the valve body remote from the valve seat, and the downstream part of the pipe is reduced.

According to another feature of the invention the housing of the valve may be provided with a stop surface, against which the valve body can bear in such a position, that the valve body almost closingly bears against the valve seat when the pipe extends horizontally and there is hardly any liquid flow or no flow at all. This stop surface may form part of the wall of the housing which extends as far as a point quite near the valve body, at the side of the pipe opposite the valve casing, when the valve body bears on the valve seat. It will be apparent that, other than is the case with a vertical pipe, the valve body will not bear against the valve seat as a result of its own mass when the pipe extends horizontally and consequently the valve seat extends substantially in a vertical plane. By positioning the stop surface in such a manner that the valve body bearing against it is located at a very short distance from the valve seat, the valve body will be pressed against the seat at the slightest flow of the liquid in the direction to be blocked, as a result of which the liquid flow will be blocked.

According to another feature of the invention the valve body is made of polyurethane, whereby one or more pieces of a material having a different specific mass, higher or lower, are provided within the spherical valve body. In practice polyurethane has appeared to be a very suitable material for the surface of the valve body. Possibly because the specific mass of polyurethane is approximately the same as that of the liquid to be treated, polyurethane has never been used as a material for a spherical valve body of a non-return valve. When according to the invention pieces of a material having a different specific mass are incorporated in the casting material when forming the spherical valve body, the specific mass of the valve body can be adjusted in a simple manner. Thus pieces of a metal may be incorporated in the polyurethane, in order to obtain a sinking valve body. In this manner it is possible to obtain valve bodies which are outwardly identical, but which each have a different mass.

For a better understanding of the invention an embodiment of the invention will be described hereafter with reference to a drawing.

FIG. 1 is a perspective sectional view of the housing of a non-return valve; and FIGS. 2–6 are sectional views of the housing, wherein the various positions of the valve body are indicated.

Like parts are numbered alike in the various Figures. The Figures are only schematic illustrations, showing a non-return valve such as may be present in a horizontal pipe.

FIG. 1 shows the housing of a non-return valve, which housing is provided with two flanges 1, 2, by means of which the housing may be mounted within a pipe. For that purpose the flanges 1, 2 may be provided with holes (not shown), through which bolts may extend. The housing is provided with a substantially cylindrical passage 3, through which liquid can flow when the housing is mounted in a pipe. Passage 3 has substantially the same cross-section as the other part of the pipe in which the housing is mounted.

The housing is furthermore provided with a valve seat 4, which extends substantially in a plane transversely to the direction of the passage 3. A substantially spherical valve body (not shown in FIG. 1) may bear against the valve seat 4. The diameter of the valve seat 4 is approximately equal to the diameter of the cylindrical passage 3, whilst the diameter of the valve body is considerably larger, in order for the valve body to bear correctly against the valve seat 4. It will be apparent that a liquid flow towards the left (in the Figures) is blocked when the valve body bears against the valve seat 4 and is thereby pressed against the valve seat 4 by the liquid pressure.

A liquid flow towards the right will move the valve body away from the valve seat 4, however, so that a passage is formed and the liquid is able to flow. In order to move the valve body outside the flow of the liquid a valve casing 5 is provided, said valve casing sloping upwards in the illustrated embodiment. The valve casing 5, at least part of it, has a substantially cylindrical shape, whose diameter is slightly larger than the diameter of the valve body, and which is consequently considerably larger than the diameter of the cylindrical passage 3. The valve casing 5 is provided with a cover 6 with a substantially semi-spherical shape, which cover 6 is detachably connected to the housing. The valve body may be placed within the housing by removing the cover 6.

The housing is furthermore provided with an inward projection 7, which forms a guide against which the valve body may abut. The shape of the projection or guide 7 is such that the spherical valve body is guided obliquely upwards into the valve casing 7 when the valve body is positioned at some distance from the valve seat 4.

Furthermore the shape of the housing is important at the point where the cylindrical shape of the valve casing 5 and the cylindrical shape of the passage 3 are interconnected, which point will be indicated as the axil 8. Near the axil 8 the housing is provided with an outward projection 9. This projection 9 may be provided on either side of the plane of symmetry of the housing, said plane being hatched in the Figures. The result of the projection 9 being provided is that the wall of the housing does not follow the normal line of intersection between the cylindrical valve casing 5 and the cylindrical passage 3, but that there is a space inside the housing at this imaginary line of intersection where liquid can flow.

FIGS. 2–6 respectively show the same cross-section of the housing of FIG. 1, with the spherical valve body 10, which is indicated by a dashed line, occupying different positions. The operation of the non-return valve will be discussed with reference to these Figures.

Figure 2:
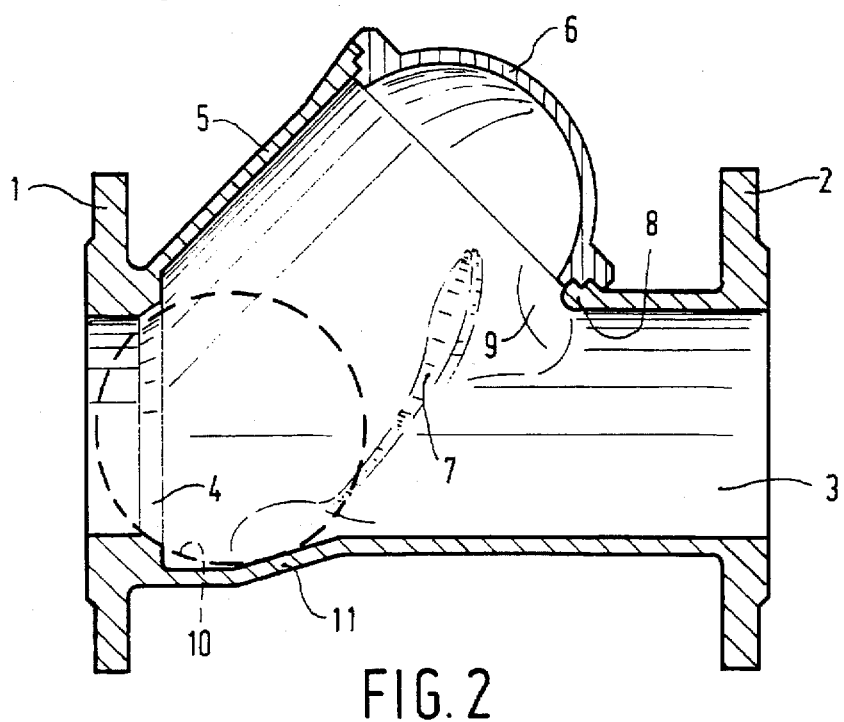

In the situation of FIG. 2 there is hardly any liquid flow or no flow at all, so that the spherical valve body 10, which has a higher specific mass than the liquid, will move towards the lowest point. In this position the valve body 10 bears against a part of the valve seat 4 located at the bottom side, and against a stop 11 formed by a part of the wall of the housing which is located at such a place that the valve body 10 bearing against said stop nearly closes down on the valve seat 4, leaving open a small opening at the upper side of the valve seat 4, however. The position of the valve body 10 which bears against the stop 11 is such that already when there is a minimal liquid flow towards the left the valve body 10 closes down on the valve seat 4, becoming disengaged from the stop 11 thereby.

Figure 3:
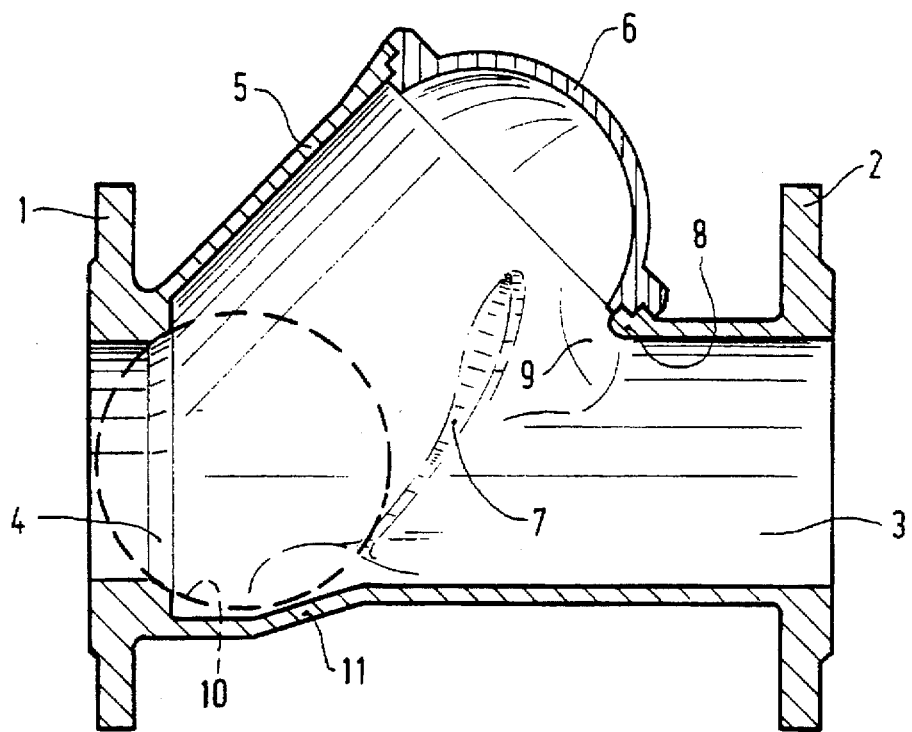

FIG. 3 illustrates this situation of the valve body 10, whereby the valve body 10 is spaced from the stop 11 by a small distance. Consequently the valve body 10 is not influenced by the stop 11 when it bears closingly against the valve seat 4, so that a correct shutting off can be achieved. As long as the liquid pressure in the cylindrical passage 3 is higher than the liquid pressure on the left-hand side of the valve body, the non-return valve will remain closed, that is, the valve body 10 will maintain its closing position against the valve seat 4, so that a flow of the liquid towards the left is blocked.

Figure 4:
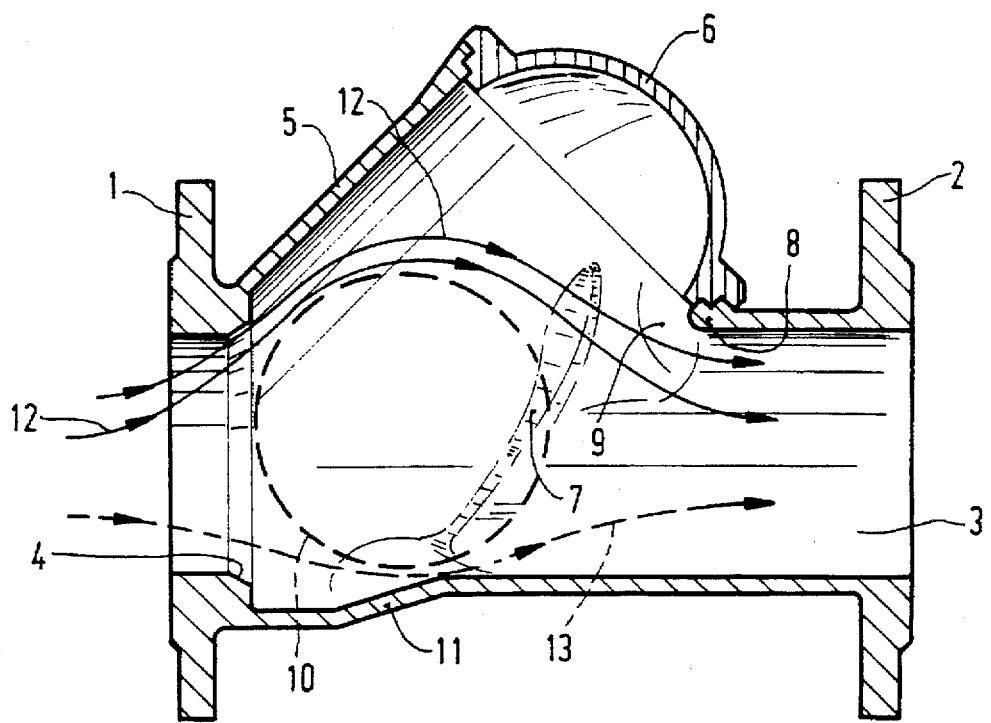

FIG. 4 shows the situation in which a small flow of the liquid towards the right has started. The non-return valve opens thereby, because the valve body 10 moves towards the right and becomes disengaged from the valve seat 4. The housing of the non-return valve is configured such that most of the liquid passes at the upper side of the valve body, as is indicated by means of the arrows 12. This flow of the liquid is achieved by a number of factors, which have been applied in conjunction with each other, whereby each of said factors individually may also cause the effect according to the invention, however. These factors are:

(1) the shape of the guide 7 (inward projection of the housing), which is such that the valve body initially moves more to the right than upwards from the valve seat;

(2) the shape of the outer wall of the housing at the bottom side, which is such that when the valve body 10 occupies the position shown in the Figure, this wall extends to a point quite near the valve body 10; and (3) the housing near the axil 8, which has outward projections, which are configured such that the liquid flowing into the valve casing 5 can readily flow towards the downstream part of the passage 3.

Figure 5:
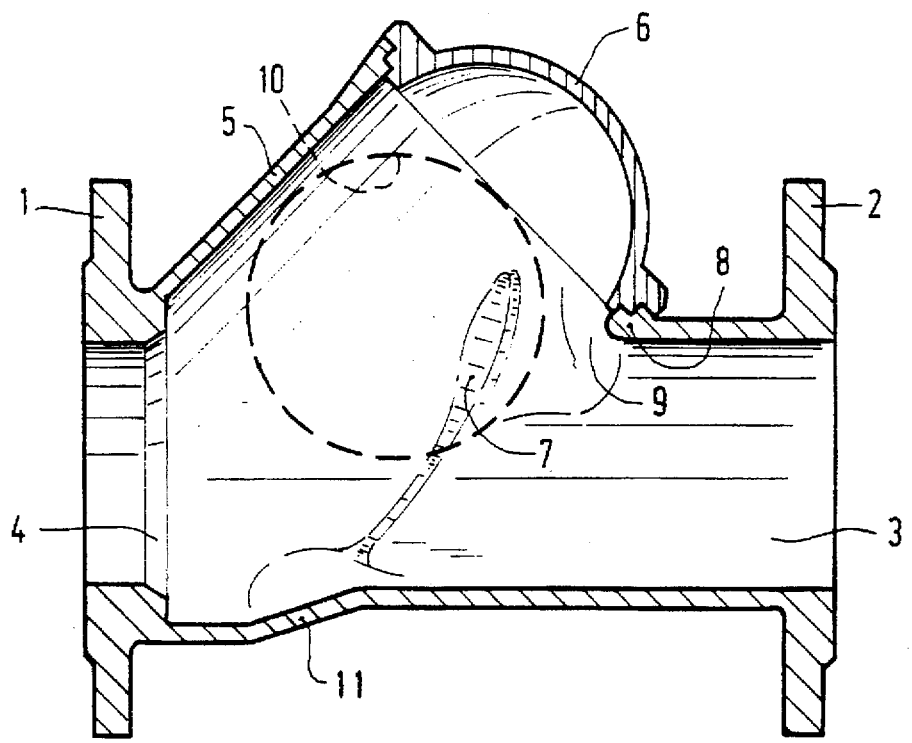

Because the liquid has little space for passing at the bottom side of the valve body 10 (this flow is indicated by the dashed line 13), there will be an increase of the liquid pressure at the bottom side of the valve body 10. On the other hand the liquid passing at the upper side of the valve body 10 will expand, because it can flow off via a wide passage near the axil 8, as a result of which the liquid pressure within the valve casing 5 is reduced. The result will be that the valve body 11 will move upwards against the force of gravity, controlled by the guide 7, when the flow of liquid is sufficient to effect this. FIG. 5 shows the situation wherein the valve body 10 is partly located within the valve casing 5, which is the result of the flow of the liquid, as described above. In this situation the space between the spherical valve body 10 and the cover 6 of the valve casing is connected, via the wide passage near the axil 8, to the downstream part of the passage 3, so that the pressure inside the valve casing is lower above the valve body 10 than under the valve body. The wide passage for the liquid near the axil 8 is achieved by the outward projections 9 of the housing, as described with reference to FIG. 1.

Figure 6:
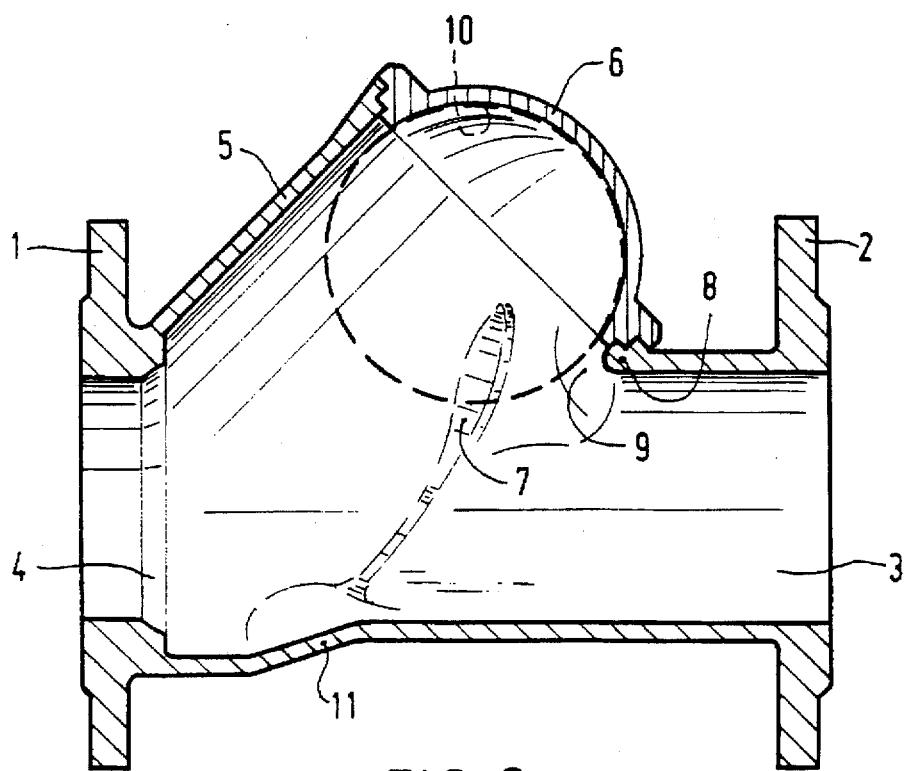

When the liquid flow towards the right is sufficient the valve body 10, controlled by the guide 7, will take up a position quite near or against the cover 6 of the valve casing 5, as shown in FIG. 6. The valve body 10 is thereby positioned entirely or nearly entirely outside the liquid flow, so that the liquid encounters hardly any resistance when flowing through the non-return valve.

Tests have shown that with known valves, which are likewise provided with a valve casing, the valve body only moves in the direction of the valve casing to a limited degree, lingering somewhere halfway, because the flow of the liquid is such that the valve body is kept in a certain position by the liquid flow, whereby the valve body may or may not vibrate in an objectionable manner. Because the valve body is not visible during operation of the non-return valve, this problem has not been recognized before.

The non-return valve may also be provided with a valve body having a lower specific mass than the liquid, whereby the valve casing will of course not slope upwards (as illustrated in the drawing), but downwards. The operation of such a non-return valve is otherwise the same as described above.

The non-return valve may also be mounted within a vertical pipe, whereby the valve seat extends substantially in a horizontal plane. In that case the valve body will bear against the valve seat when there is hardly any flow or no flow at all, so that the stop surface 11 described before does not perform any function. Also with a vertical pipe both a floating as well as a sinking valve body may be used.

The above-described embodiment is to be considered as an example only, its only purpose being to explain in more detail a number of aspects of the invention.

I claim:

1. A ball check valve assembly having a housing defining a generally cylindrical passageway and an annular valve seat coaxial with said passageway and disposed transversely thereto, said valve seat having a diameter substantially the same as the diameter of said passageway, a spherical valve body received within said housing and having a diameter greater than the diameter of said valve seat thereby preventing the flow of liquid through said passageway in a first direction when said valve body is in a first position in engagement with said valve seat and permitting flow in a second direction opposite said first direction when said valve body is in spaced relationship with said valve seat, said housing including a generally cylindrical valve casing including a detachable cover defining a closed chamber, said valve casing communicating with said passageway along an imaginary line of intersection between said cylindrical valve casing and said cylindrical passageway, said imaginary line extending from a first location adjacent said valve seat to a second location remote from said valve seat, said second location being downstream with respect to said first location and being adjacent an axil interconnecting said valve casing and said passageway, said valve casing having a diameter larger than the diameter of said valve body and being configured for receiving said valve body in said chamber in a second position wherein said valve body is in substantial adjoining relationship with said detachable cover, said detachable cover extending angularly outwardly from said axil relative to said imaginary line of intersection and being substantially out of said passageway, said housing including guide means projecting into said passageway for being engaged by said valve body to guide the valve body from said first position toward said second position, said housing including at least one outwardly extending projection adjacent said second location forming a space inside said housing between said valve casing and said passageway adjacent said axil for enabling liquid to flow from said valve casing into said passageway through said space thereby decreasing liquid pressure in an area between the valve body and the detachable cover to a value less than the liquid pressure in an area between the valve seat and the valve body such that the imbalance in liquid pressure will cause the valve body to be moved to its second position in substantial adjoining relationship with said detachable cover.

2. The ball check valve assembly according to claim 1, wherein said detachable cover is hemi-spherical in shape for co-extensive engagement with a substantial portion of the valve body.

3. The ball check valve assembly according to claim 1 further defined by a pair of oppositely disposed outwardly extending projections.

4. The ball check valve assembly according to claim 1 wherein said generally cylindrical passageway and said generally cylindrical valve casing define longitudinal central axes intersecting at an approximate angle of 45°.

5. The ball check valve assembly according to claim 1 wherein the valve body is made partially of polyurethane and wherein one or more pieces of a material having a different specific mass than polyurethane are provided within the spherical valve body.

* * * * *